(12) United States Patent
Inomata et al.

(10) Patent No.: US 9,177,134 B2
(45) Date of Patent: Nov. 3, 2015

(54) INFORMATION PROCESSING APPARATUS, INFORMATION PROCESSING METHOD, AND NON-TRANSITORY COMPUTER READABLE MEDIUM

(75) Inventors: Kohshiro Inomata, Kanagawa (JP); Hirochika Shionoiri, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 182 days.

(21) Appl. No.: 13/487,776

(22) Filed: Jun. 4, 2012

(65) Prior Publication Data

US 2013/0167217 A1   Jun. 27, 2013

(30) Foreign Application Priority Data

Dec. 26, 2011   (JP) ................................ 2011-284174

(51) Int. Cl.
    G06F 15/16   (2006.01)
    G06F 21/41   (2013.01)
    G06F 17/30   (2006.01)
    G06F 7/04    (2006.01)
    H04L 29/06   (2006.01)

(52) U.S. Cl.
    CPC ...................................... G06F 21/41 (2013.01)

(58) Field of Classification Search
    None
    See application file for complete search history.

(56) References Cited

U.S. PATENT DOCUMENTS

| | | | | |
|---|---|---|---|---|
| 2006/0070011 A1* | 3/2006 | Matsuhara et al. | ........... | 715/816 |
| 2008/0077717 A1* | 3/2008 | Okutsu | ........................... | 710/40 |
| 2008/0077809 A1* | 3/2008 | Hayler et al. | ................. | 713/193 |
| 2008/0250494 A1* | 10/2008 | Nagata | ............................. | 726/19 |
| 2008/0282333 A1* | 11/2008 | Teramoto et al. | ................. | 726/8 |
| 2009/0228962 A1* | 9/2009 | Pathak | ............................. | 726/5 |
| 2011/0258697 A1* | 10/2011 | Ikeda | ............................. | 726/16 |
| 2012/0047450 A1* | 2/2012 | Sato | ............................. | 715/760 |
| 2012/0204234 A1* | 8/2012 | Kuroda | ............................. | 726/4 |
| 2014/0002850 A1* | 1/2014 | Kang | ........................... | 358/1.14 |

FOREIGN PATENT DOCUMENTS

JP    A-2008-282216    11/2008

* cited by examiner

*Primary Examiner* — Shin-Hon Chen
(74) *Attorney, Agent, or Firm* — Oliff PLC

(57) ABSTRACT

An information processing apparatus includes following components. An authentication processing unit authenticates a user. A display displays information. An accessing unit accesses an external service. An authenticated-access-information acquiring unit acquires authenticated access information associated with user information for identifying an authenticated user. An unauthenticated-access-information acquiring unit acquires unauthenticated access information having been input by an unauthenticated user when accessing the external service. A controller performs control, when an authenticated user attempts to access the external service, so that the authenticated-access-information acquiring unit acquires authenticated access information associated with user information of the user and the accessing unit accesses the external service by using the acquired authenticated access information, and, when a user attempts to access the external service without being authenticated, so that the unauthenticated-access-information acquiring unit acquires the unauthenticated access information and the display displays the acquired unauthenticated access information.

15 Claims, 9 Drawing Sheets

FIG. 3

| DEVICE USER ID | SERVICE ID | SERVICE USER ID | SERVICE PASSWORD |
|---|---|---|---|
| 12345 | A | XXXXX | aaaaaa |
| | B | XXXXX@abc.jp | bbbbbb |
| | C | XXXXX@aaa.jp | ccccccc |
| 56789 | A | YYYYY | dddddd |
| | B | YYYYY@abc.jp | eeeeeee |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-284174 filed Dec. 26, 2011.

BACKGROUND (i) Technical Field

The present invention relates to an information processing apparatus, an information processing method, and a non-transitory computer readable medium.

(ii) Related Art

When an image forming apparatus having functions of a copier, a printer, and so forth is installed in an environment, such as an office, and is shared by plural users, user registration to the image forming apparatus may be requested. For example, in a case of restricting utilization of functions of an image forming apparatus, an authentication process regarding the image forming apparatus is performed for users, and unauthenticated users are restricted from utilizing the functions.

When an authentication process is performed by an image forming apparatus, a user inputs their authentication information, e.g., the user ID and the password, to the image forming apparatus.

A user may access various web services from an image forming apparatus via a communication channel, such as a network, and utilize the web services by using the image forming apparatus. For example, web services are provided which involve the copy function and the scan function of an image forming apparatus. When such web services are utilized with an image forming apparatus, an authentication process regarding the web services has to be performed from the image forming apparatus.

SUMMARY

According to an aspect of the invention, there is provided an information processing apparatus including an authentication processing unit, a display, an accessing unit, an authenticated-access-information acquiring unit, an unauthenticated-access-information acquiring unit, and a controller. The authentication processing unit performs an authentication process for a user. The display displays information. The accessing unit accesses an external service via a communication channel. The authenticated-access-information acquiring unit acquires authenticated access information which is authentication information for accessing the external service with the accessing unit and for utilizing the external service and which is associated with user information for identifying a user who has been authenticated by the authentication processing unit. The unauthenticated-access-information acquiring unit acquires unauthenticated access information which is authentication information having been input by an unauthenticated user who has not been authenticated by the authentication processing unit and having been used at the time of accessing the external service. When a user who has been authenticated by the authentication processing unit attempts to access the external service by using the accessing unit, the controller performs control so that the authenticated-access-information acquiring unit acquires authenticated access information associated with user information of the user who has been authenticated by the authentication processing unit and the accessing unit accesses the external service by using the authenticated access information acquired by the authenticated-access-information acquiring unit. When a user attempts to access the external service by using the accessing unit without being authenticated by the authentication processing unit, the controller performs control so that the unauthenticated-access-information acquiring unit acquires the unauthenticated access information and the display displays the unauthenticated access information acquired by the unauthenticated-access-information acquiring unit.

BRIEF DESCRIPTION OF THE DRAWINGS

Exemplary embodiments of the present invention will be described in detail based on the following figures, wherein:

FIG. 3 illustrates an example of management information of users who have been authenticated by the image forming apparatus;

DETAILED DESCRIPTION

Figure 1:
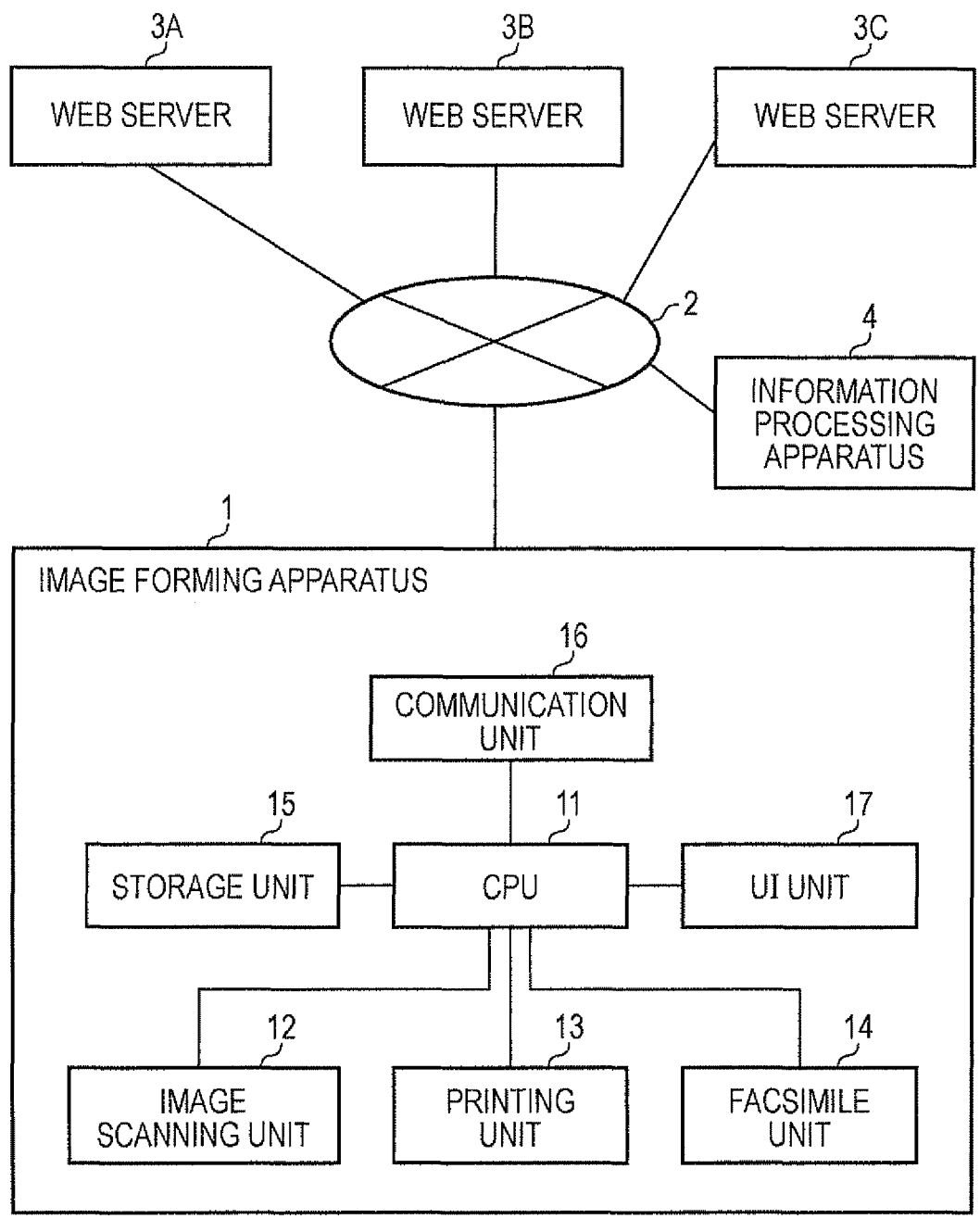
FIG. 1 is a block diagram illustrating an image forming system according to an exemplary embodiment of the present invention.

An image forming apparatus and a program according to exemplary embodiments of the present invention will be described with reference to FIGS. 1 and 2. FIG. 1 illustrates an example of an image forming system according to an exemplary embodiment of the present invention. The image forming system includes an image forming apparatus 1 and web servers 3A, 3B, and 3C that provide web services to the image forming apparatus 1. The image forming apparatus 1 and the web servers 3A, 3B, and 3C are connected to a communication channel 2. The image forming apparatus 1 accesses the web servers 3A, 3B, and 3C via the communication channel 2, receives data from the web servers 3A, 3B, and 3C, and sends data to the web servers 3A, 3B, and 3C. Additionally, an information processing apparatus 4, such as a personal computer, may be connected to the communication channel 2. Although three web servers (i.e., the web servers 3A, 3B, and 3C) are illustrated in the example of FIG. 1, the number of web servers is not limited to this particular example and may be less than three or more than three. In addition, plural image forming apparatuses 1 may be connected to the communication channel 2. Furthermore, the image forming apparatus 1 and the communication channel 2 may be connected to a document management server or other information processing servers, which perform external services.

The communication channel 2 is constituted by a network, e.g., a local area network (LAN) or a wide area network (WAN).

Examples of the web services provided by the web servers 3A, 3B, and 3C include a service for providing a user with stored images, documents, and so forth in a viewable manner by using the image forming apparatus 1 or allowing a user to download the images, documents, and so forth to the image forming apparatus 1, and a service for receiving and storing image data of images scanned by the image forming apparatus 1. In the following description, a service provided by the web server 3A, a service provided by the web server 3B, and a service provided by the web server 3C are referred to as a "web service A", a "web service B", and a "web service C", respectively. Here, the image forming apparatus is an exemplary embodiment of an information processing apparatus. The information processing apparatus is not limited to the image forming apparatus, and may include any apparatus which may be connected to external services.

The image forming apparatus 1 is an apparatus having at least one of a function of printing an image of received data and a function of scanning an image held on a paper document and converting the image into electronic data. For example, the image forming apparatus 1 has functions of a copier, a printer, a scanner, and a facsimile machine. However, the functions are not limited to these functions, and a printer without the scan function and a scanner without the print function are also included in the scope of the image forming apparatus 1 according to this exemplary embodiment. The image forming apparatus 1 is installed in an environment, e.g., an office, a convenience store, a library, a hotel, or an apartment, in which the image forming apparatus 1 is shared by plural users.

By way of example, the image forming apparatus 1 includes a central processing unit (CPU) 11, an image scanning unit 12, a printing unit 13, a facsimile unit 14, a storage unit 15, a communication unit 16, and a user interface (UI) unit 17. The CPU 11 controls the image forming apparatus 1. The image scanning unit 12 scans an image held on a document, generates image data representing the image, and stores the generated image data in the storage unit 15. The printing unit 13 prints an image on a sheet. The facsimile unit 14 sends an image by fax. The storage unit 15 includes a hard disk drive (HDD), a random access memory (RAM), and a read only memory (ROM). The storage unit 15 stores programs to be executed by the CPU 11, control data, image data, and so forth. The communication unit 16, e.g., a network interface, connects the image forming apparatus 1 to the communication channel 2, receives data from the web servers 3A, 3B, and 3C, and sends data to the web servers 3A, 3B, and 3C. The UI unit 17 includes, for example, an input device and a display. The UI unit 17 accepts various kinds of information input by a user, and displays screens regarding image processing. Additionally, the image forming apparatus 1 may have a copy function in which the image scanning unit 12 scans an image held on a document and the printing unit 13 prints the scanned image on a sheet, whereby the image held on the document is copied on the sheet. The image forming apparatus 1 does not have to include all of the image scanning unit 12, the printing unit 13, and the facsimile unit 14, but may include at least one of the image scanning unit 12, the printing unit 13, and the facsimile unit 14.

Figure 2:
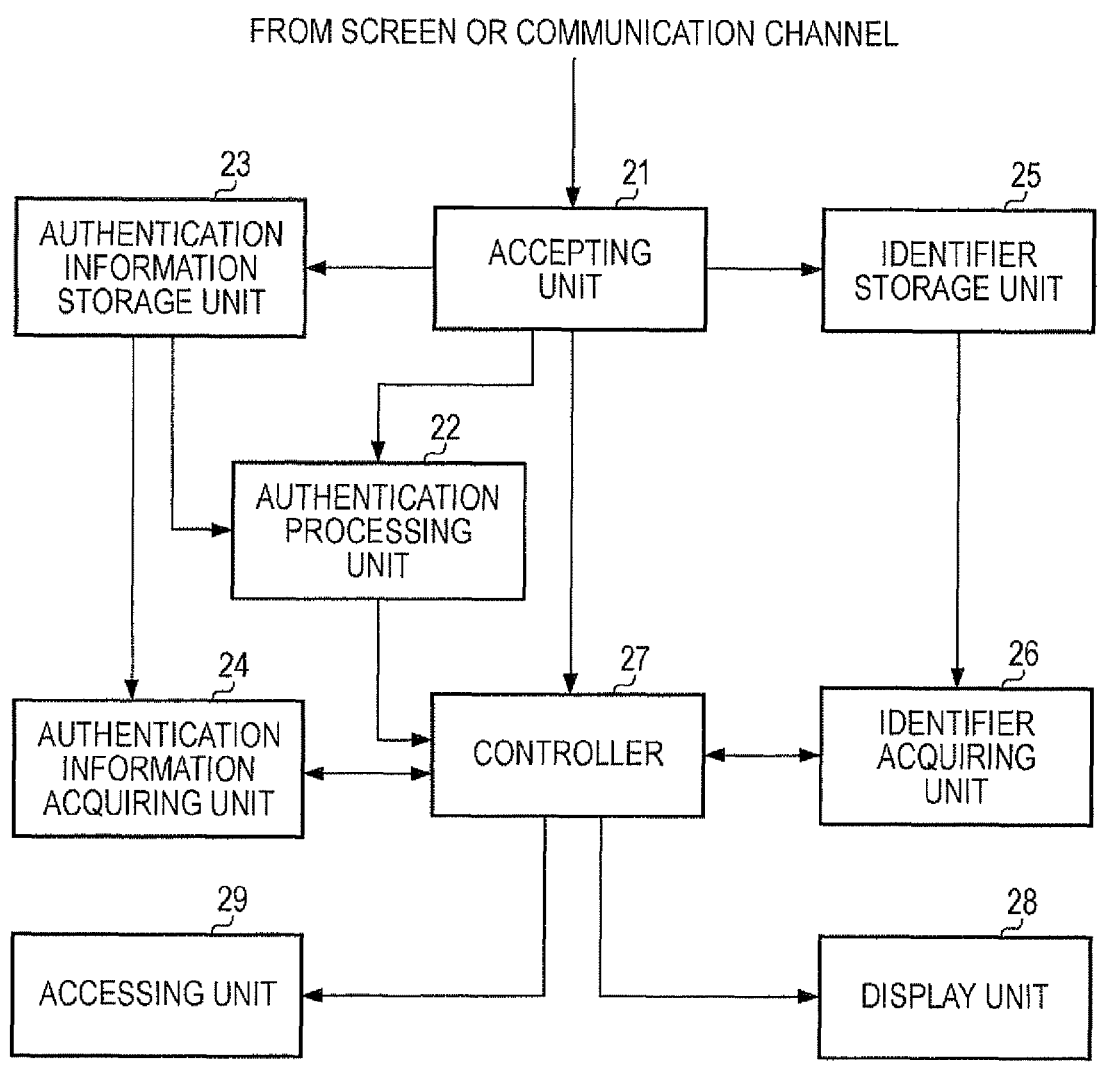
FIG. 2 is a functional block diagram of an image forming apparatus according to the exemplary embodiment of the present invention.

Referring now to FIG. 2, an example of functions of the image forming apparatus 1 for utilizing web services provided by the web servers 3A, 3B, and 3C will be described. FIG. 2 is a functional block diagram illustrating an example of functions of the image forming apparatus 1 for utilizing web services provided by the web servers 3A, 3B, and 3C. The image forming apparatus 1 includes an accepting unit 21, an authentication processing unit 22, an authentication information storage unit 23, an authentication information acquiring unit 24, an identifier storage unit 25, an identifier acquiring unit 26, a controller 27, a display unit 28, and an accessing unit 29.

The accepting unit 21 accepts various kinds of information input by a user from the UI unit 17, and accepts various kinds of information input from the communication unit 16 via the communication channel 2. For example, the accepting unit 21 accepts authentication information regarding the rights to use the image forming apparatus 1 from the UI unit 17. The authentication information regarding the rights to use the image forming apparatus 1 is information used when a user is authenticated by the image forming apparatus 1 and logs into the image forming apparatus 1. This authentication information includes user identification information for identifying a user who is to use the image forming apparatus 1, and a password for logging into the image forming apparatus 1. The user identification information is, for example, a user ID or user name. In the following description, the authentication information regarding the rights to use the image forming apparatus 1, the user identification information for identifying a user who is to use the image forming apparatus 1, and the password for the image forming apparatus 1 are referred to as "device authentication information", "device user identification information", and a "device password", respectively. In addition, the user ID for identifying a user who is to use the image forming apparatus 1 is referred to as a "device user ID". The device user identification information corresponds to an example of "user information". The accepting unit 21 outputs the device authentication information to the authentication processing unit 22. Also, the accepting unit 21 may output the device authentication information to the authentication information storage unit 23 and store the device authentication information in the authentication information storage unit 23.

For example, once a user inputs their device user ID and device password using the UI unit 17 in order to be authenticated by the image forming apparatus 1 and log into the image forming apparatus 1, the accepting unit 21 accepts the device user ID and the device password from the UI unit 17, and outputs the device authentication information including the device user ID and the device password to the authentication processing unit 22.

As the method for inputting the device authentication information to the image forming apparatus 1, there is a method in which an IC card is used or a method in which a software keyboard is used. For example, the image forming apparatus 1 may be equipped with a card reader and a user may place an IC card that has the device authentication information stored therein over the card reader, thereby inputting the device authentication information stored in the IC card to the image forming apparatus 1. For example, when the image forming apparatus 1 is installed at an office, an employee number serving as the user identification information and the device password may be stored in an employee ID card (i.e., an IC card) and a user may place their employee ID card over the card reader, thereby inputting the device authentication information to the image forming apparatus 1.

The accepting unit 21 also accepts from the UI unit 17 authentication information for accessing the web servers 3A, 3B, and 3C from the image forming apparatus 1 and utilizing web services. The authentication information for utilizing a web service includes user identification information for identifying a user who is to utilize the web service and a password for logging into the web service. The user identification information is, for example, a user ID (account) or user name. An authentication process is performed for a user in each of the web servers 3A, 3B, and 3C using the authentication information for the corresponding web service. If the authentication is successful, the authenticated user is permitted to access the web server 3A, 3B, or 3C from the image forming apparatus 1 and to utilize the web service. In the following description, the authentication information for utilizing a web service and the user identification information for identifying a user who is to utilize each web service are referred to as "service authentication information" and "service user identification information", respectively. The password corresponding to the service authentication information of each web service is referred to as a "service password". Additionally, the user ID for identifying a user who is to utilize each web service is referred to as a "service user ID". The service authentication information corresponds to an example of "authenticated access information", whereas the service user identification information corresponds to an example of "unauthenticated access information". The accepting unit 21 outputs the service authentication information to the controller 27. Also, the accepting unit 21 may output the service authentication information corresponding to each web service to the authentication information storage unit 23 and store the service authentication information in the authentication information storage unit 23. Additionally, the accepting unit 21 may output the service user identification information corresponding to each web service to the identifier storage unit 25 and stare the service user identification information in the identifier storage unit 25. Furthermore, the accepting unit 21 may output the service authentication information, which includes the service user identification information corresponding to each web service and the service password, to the identifier storage unit 25 and store the service authentication information in the identifier storage unit 25.

For example, once a user inputs their service user ID and service password using the UI unit 17 in order to utilize a desired web service with the image forming apparatus 1, the accepting unit 21 accepts the service user ID and the service password from the UI unit 17, and outputs to the controller 27 the service authentication information including the service user ID and the service password.

Additionally, a user or administrator may associate the device user identification information of a user who has been authenticated by the image forming apparatus 1 with their service authentication information by using the information processing apparatus 4. In this case, the information processing apparatus 4 sends the service authentication information associated with the device user identification information to the image forming apparatus 1 via the communication channel 2. The accepting unit 21 accepts the service authentication information associated with the device user identification information of the user who has been authenticated by the image forming apparatus 1, from the communication unit 16 via the communication channel 2. The accepting unit 21 then outputs the service authentication formation associated with the device user identification information to the authentication information storage unit 23, and stores the service authentication information in the authentication information storage unit 23. Furthermore, an administrator or the like may create the service user identification information used by a user who has not been authenticated by the image forming apparatus 1 to utilize each of the web services A, B, and C, by using the information processing apparatus 4. In this case, the information processing apparatus 4 sends the service user identification information to the image forming apparatus 1 via the communication channel 2. The accepting unit 21 accepts the service user identification information from the communication unit 16 via the communication channel 2. The accepting unit 21 then outputs the service user identification information to the identifier storage unit 25 and stores the service user identification information in the identifier storage unit 25.

The authentication processing unit 22 receives the device authentication information from the accepting unit 21, and performs an authentication process regarding the image forming apparatus 1 for a user on the basis of the device authentication information. For example, the authentication processing unit 22 performs an authentication process for a user with reference to the device authentication information pre-registered in the image forming apparatus 1. By way of example, the device authentication information, which includes the device user identification information for identifying a user who is authenticated by the image forming apparatus 1 and the device password, is pre-stored in the authentication information storage unit 23. The authentication processing unit 22 compares the device authentication information stored in the authentication information storage unit 23 with the device authentication information acquired from the accepting unit 21, thereby performing an authentication process. The authentication processing unit 22 then outputs the authentication result to the controller 27.

For example, an authentication process is performed for a user in order to limit available functions of the image forming apparatus 1 on a user-by-user basis. By way of example, permission to use a predetermined minimum number of functions may be given to a user who has not been authenticated by the authentication processing unit 22, whereas permission to use all functions of the image forming apparatus 1 may be given to a user who has been authenticated by the authentication processing unit 22. For example, only monochrome printing and monochrome copying may be permitted regarding unauthenticated users, whereas color printing and color copying may be permitted regarding authenticated users. Additionally, the number of copies to be printed may be limited regarding unauthenticated users. Furthermore, available functions may be pre-registered to the image forming apparatus 1 on a user-by-user basis, and available functions may be limited in accordance with the authentication level even for users who have been authenticated by the authentication processing unit 22.

The authentication information storage unit 23 stores management information of users who have been authenticated by the authentication processing unit 22. For example, the authentication information storage unit 23 stores the device user identification information of users who have been authenticated by the authentication processing unit 22 and their service authentication information for utilizing web services provided by the web servers 3A, 3B, and 3C in association with each other. As described above, the service authentication information associated with the device user identification information may be previously acquired from the information processing apparatus 4 via the communication channel 2. Additionally, when a user has been authenticated by the authentication processing unit 22, the authentication information storage unit 23 may receive from the accepting unit 21 the device user identification information and the service authentication information input with the UI unit 17, and store the device user identification information and the service authentication information therein. The authentication information storage unit 23 corresponds to an example of an "authenticated-access-information memory".

FIG. 3 illustrates an example of management information stored in the authentication information storage unit 23. Specifically, FIG. 3 illustrates an example of the management information of users who have been authenticated by the image forming apparatus 1. Management information 100 includes, for example, the device user identification information, service information for identifying a web service provided by each of the web servers 3A, 3B, and 3C, and the service authentication information. The service information is, for example, the service ID or the name of the web service. In the example illustrated in FIG. 3, the management information 100 includes the device user ID, the service ID, the service user ID, and the service password. For example, the service user ID and the service password are set for each of the web services A, B, and C. By way of example, a user having the device user ID "12345" is permitted to access the web servers 3A, 3B, and 3C and to utilize the web services A, B, and C. Thus, the service user IDs and the service passwords for the web services A, B, and C are included in the management information 100. Additionally, a user having the device user ID "56789" is permitted to access the web servers 3A and 3B and to utilize the web services A and B. Thus, the service user IDs and the service passwords for the web services A and B are included in the management information 100.

The authentication information storage unit 23 may pre-store the device authentication information, which includes the device user identification information and the device password of a user who has been authenticated by the image forming apparatus 1.

If a user is authenticated by the authentication processing unit 22, the authentication information acquiring unit 24 acquires the service authentication information associated with the device user identification information of the authenticated user from the authentication information storage unit 23, and outputs the acquired service authentication information to the controller 27 under the control of the controller 27.

Additionally, if a user is authenticated by the authentication processing unit 22 and a specific web service is specified by the authenticated user, the authentication information acquiring unit 24 may acquire from the authentication information storage unit 23 the service authentication information that is associated with the device user identification information of the authenticated user and is for utilizing the web service specified by the authenticated user. Then, the authentication information acquiring unit 24 may output the acquired service authentication information to the controller 27. The authentication information acquiring unit 24 corresponds to an example of an "authenticated-access-information acquiring unit".

Referring to FIG. 3, for example, a case will be described in which the user having the device user ID "12345" is authenticated by the authentication processing unit 22 and the web service A is specified by this user. In this case, the authentication information acquiring unit 24 acquires from the authentication information storage unit 23 the service user ID (xxxxx) and the service password (aaaaaa) for utilizing the web service A from among the web services A, B, and C that the user having the device user ID "12345" is permitted to utilize. The authentication information acquiring unit 24 then outputs the service user ID and the service password to the controller 27.

The identifier storage unit 25 stores management information of users who have not been authenticated by the authentication processing unit 22 (unauthenticated users). Specifically, the identifier storage unit 25 stores the service user identification information having been input to the image forming apparatus 1 by unauthenticated users at the time of utilization of the web service, for each of the web services provided by the web servers 3A, 3B, and 3C. The identifier storage unit 25 may also store the service authentication information including the service user identification information and the service password which have been input to the image forming apparatus 1 by unauthenticated users at the time of utilization of the web service, for each of the web services provided by the web servers 3A, 3B, and 3C. When the user has not been authenticated by the authentication processing unit 22, the identifier storage unit 25 receives from the accepting unit 21 the service user identification information input with the UI unit 17, and stores the service user identification information therein. In addition, when the user has not been authenticated by the authentication processing unit 22, the identifier storage unit 25 may receive from the accepting unit 21 the service authentication information input with the UI unit 17 and store the service authentication information therein. The identifier storage unit 25 corresponds to an example of an "unauthenticated-access-information memory".

Figure 4:
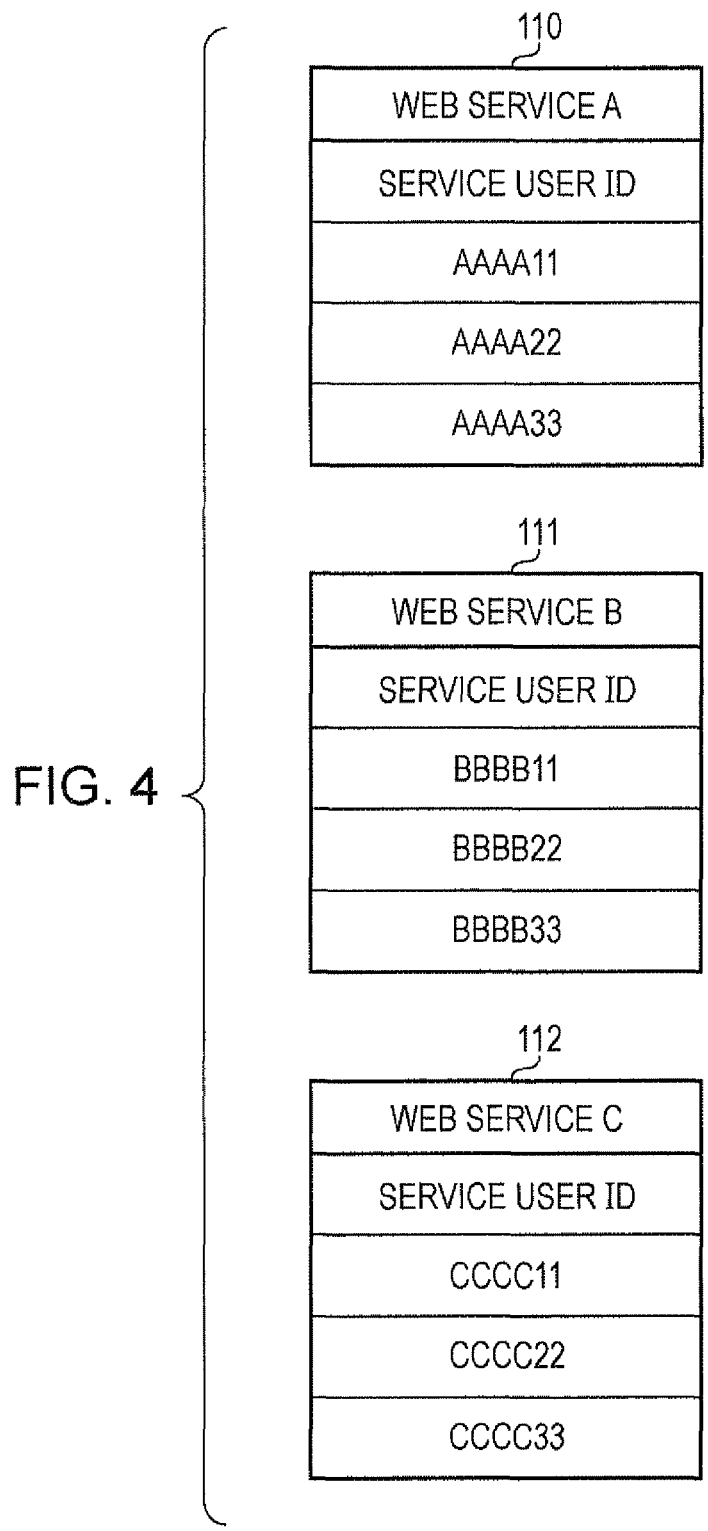
FIG. 4 illustrates an example of management information of users who have not been authenticated by the image forming apparatus.

FIG. 4 illustrates an example of management information stored in the identifier storage unit 25. Specifically, FIG. 4 illustrates an example of the management information of unauthenticated users who have not been authenticated by the image forming apparatus 1. Management information 110 is, for example, service user identification information having been input to the image forming apparatus 1 by unauthenticated users at the time of utilization of the web service A. Management information 111 is, for example, service user identification information having been input to the image forming apparatus 1 by unauthenticated users at the time of utilization of the web service B. Management information 112 is, for example, service user identification information input to the image forming apparatus 1 by unauthenticated users at the time of utilization of the web service C. In the example illustrated in FIG. 4, the service user ID is illustrated as an example of the service user identification information.

When a user has not been authenticated by the authentication processing unit 22, the identifier acquiring unit 26 acquires the service user identification information from the identifier storage unit 25 and outputs the acquired service user identification information to the controller 27 under the control of the controller 27. For example, when a specific web service is specified by a user in a state where the user has not been authenticated by the authentication processing unit 22, the identifier acquiring unit 26 acquires the service user identification information for utilizing the specified web service from the identifier storage unit 25, and outputs the acquired service user identification information to the controller 27. Referring to FIG. 4, a case will be described in which the web service A is specified by a user in a state where the user has not been authenticated by the authentication processing unit 22, for example. In this case, the identifier acquiring unit 26 acquires the service user IDs included in the management information 110 regarding the web service A, and outputs the service user IDs to the controller 27. In the example illustrated in FIG. 4, the identifier acquiring unit 26 acquires the service user IDs (AAAA11, AAAA22, and AAAA33), and outputs the service user IDs to the controller 27. When the service password is stored in the identifier storage unit 25 along with the service user identification information, the identifier acquiring unit 26 may acquire the service password along with the service user identification information from the identifier storage unit 25, and output the service user identification information and the service password to the controller 27. The identifier acquiring unit 26 corresponds to an example of an "unauthenticated-access-information acquiring unit".

The controller 27 controls each component of the image forming apparatus 1. For example, the controller 27 receives an authentication result from the authentication processing unit 22, and performs a control operation depending on the authentication result. That is, the controller 27 performs different control operations when a user has been authenticated by the authentication processing unit 22 and when a user has not been authenticated by the authentication processing unit 22. Additionally, the controller 27 causes the display unit 28 to display various screens.

For example, when a user has been authenticated by the authentication processing unit 22, the controller 27 causes the authentication information acquiring unit 24 to acquire the service authentication information associated with the device user identification information of the authenticated user. The controller 27 then outputs the service authentication information acquired by the authentication information acquiring unit 24 to the display unit 28, and causes the display unit 28 to display the service authentication information. Once the user specifies a specific web service, the controller 27 receives the specification via the accepting unit 21, and outputs the service authentication information for utilizing the specified web service to the accessing unit 29. The controller 27 controls the accessing unit 29 to cause the accessing unit 29 to access one of the web servers 3A, 3B, and 3C that provides the web service specified by the user.

When a user has been authenticated by the authentication processing unit 22 and a specific web service is specified by the authenticated user, the controller 27 may cause the authentication information acquiring unit 24 to acquire the service authentication information that is associated with the device user identification information of the authenticated user and is for utilizing the specified web service. The controller 27 then outputs the service authentication information acquired by the authentication information acquiring unit 24 to the display unit 28, and causes the display unit 28 to display the service authentication information. Once a user inputs an access instruction, the controller 27 receives the instruction via the accessing unit 21, and outputs the service authentication information for utilizing the specified web service to the accessing unit 29. The controller 27 then controls the accessing unit 29 to cause the accessing unit 29 to access one of the web servers 3A, 3B, and 3C that provides the web service specified by the user.

When a specific web service is specified by a user in a state where the user has not been authenticated by the authentication processing unit 22, the controller 27 causes the identifier acquiring unit 26 to acquire the service user identification information for utilizing the specified web service. The controller 27 then outputs the service user identification information acquired by the identifier acquiring unit 26 to the display unit 28, and causes the display unit 28 to display the service user identification information. Once the user specifies specific service user identification information and inputs the service password, the controller 27 receives the specification and the input service password via the accepting unit 21, and outputs to the accessing unit 29 the service authentication information which includes the specified service user identification information and the input service password. The controller 27 then controls the accessing unit 29 to cause the accessing unit 29 to access one of the web servers 3A, 3B, and 3C that provides the web service specified by the user.

When the service authentication information is input by a user via the UI unit 17, the controller 27 receives the service authentication information input by the user from the accepting unit 21, and outputs the service authentication information to the accessing unit 29. The controller 27 then controls the accessing unit 29 to cause the accessing unit 29 to access one of the web servers 3A, 3B, and 3C that provides the web service specified by the user.

The display unit 28 is, for example, a display of the UI unit 17. Under the control of the controller 27, the display unit 28 displays various screens. For example, the display unit 28 displays an initial menu screen of the image forming apparatus 1, a login screen for logging into the image forming apparatus 1, a menu screen for a user who has been authenticated by the image forming apparatus 1, a login screen for logging into a web service, and so forth. Data of the screens displayed on the display unit 28 is pre-stored in the storage unit 15, for example. The controller 27 causes the display unit 28 to display the screens based on the data stored in the storage unit 15.

Under the control of the controller 27, the accessing unit 29 accesses the web servers 3A, 3B, and 3C with the communication unit 16 via the communication channel 2, receives data from the web servers 3A, 3B, and 3C, and sends data to the web servers 3A, 3B, and 3C. For example, the accessing unit 29 sends the service authentication information to one of the web servers 3A, 3B, and 3C that provides the web service specified by the user. Also, the accessing unit 29 may receive a result of authentication based on the service authentication information from the web server.

The CPU 11 executes a program stored in the storage unit 15, whereby functions illustrated in FIG. 2 are generally realized. However, some of the functions may be configured as hardware. For example, the CPU 11 executes a program stored in the storage unit 15, whereby the functions of the accepting unit 21, the authentication processing unit 22, the authentication information acquiring unit 24, the identifier acquiring unit 26, the controller 27, and the accessing unit 29 are realized. The program is stored in the storage unit 15 via a recording medium such as a compact disc (CD) or a digital versatile disc (DVD), or via a communication channel such as a network. The program may also be pre-stored in the storage unit 15. The program stored in the storage unit 15 is read out to a memory and is executed by the CPU 11, whereby the functions of the above-described components are realized. Additionally, the authentication information storage unit 23 and the identifier storage unit 25 may be constituted by the storage unit 15.

Figure 5:
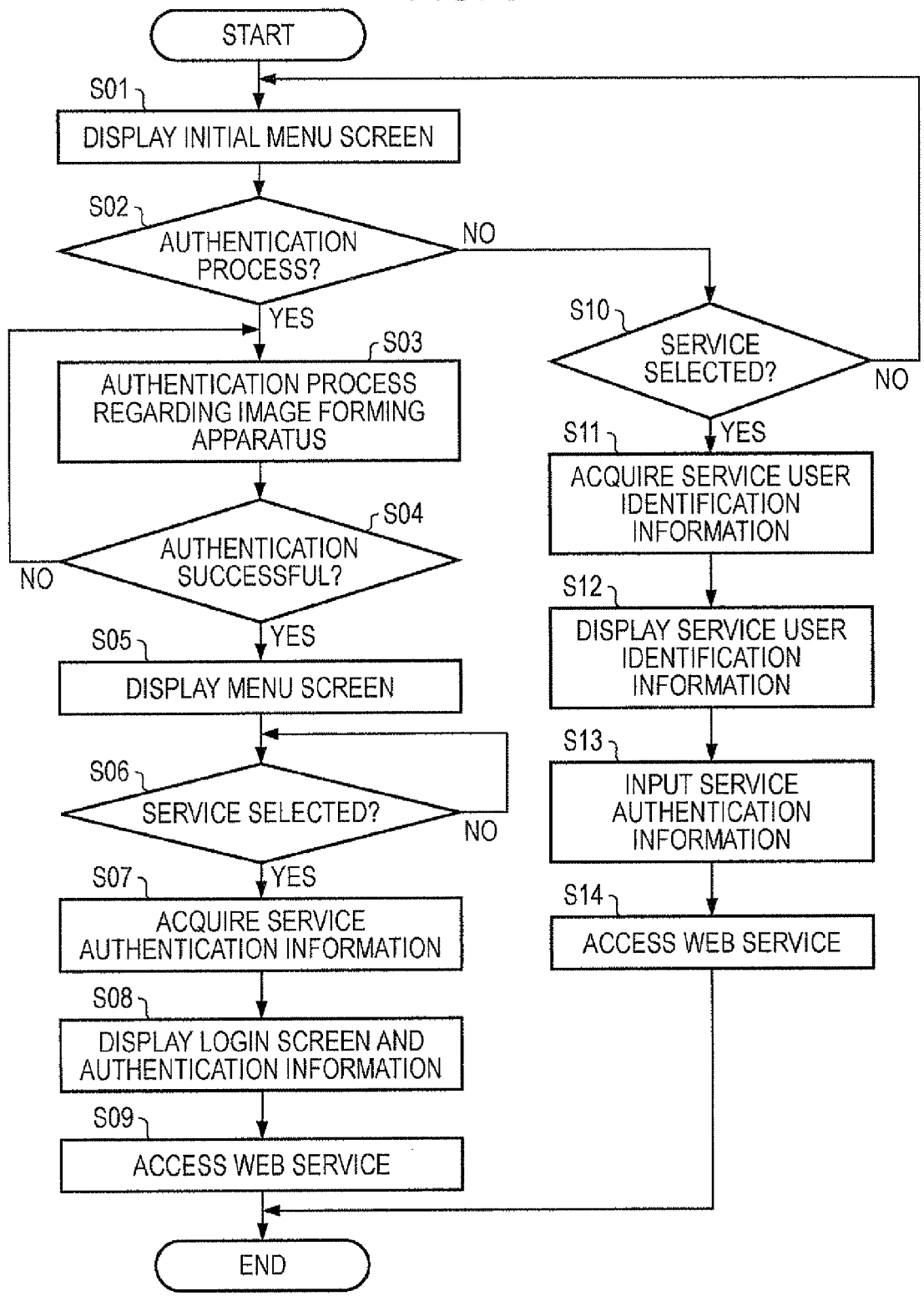
FIG. 5 is a flowchart illustrating an example of a procedure of a process performed by the image forming apparatus according to an exemplary embodiment of the present invention.
Figure 6:
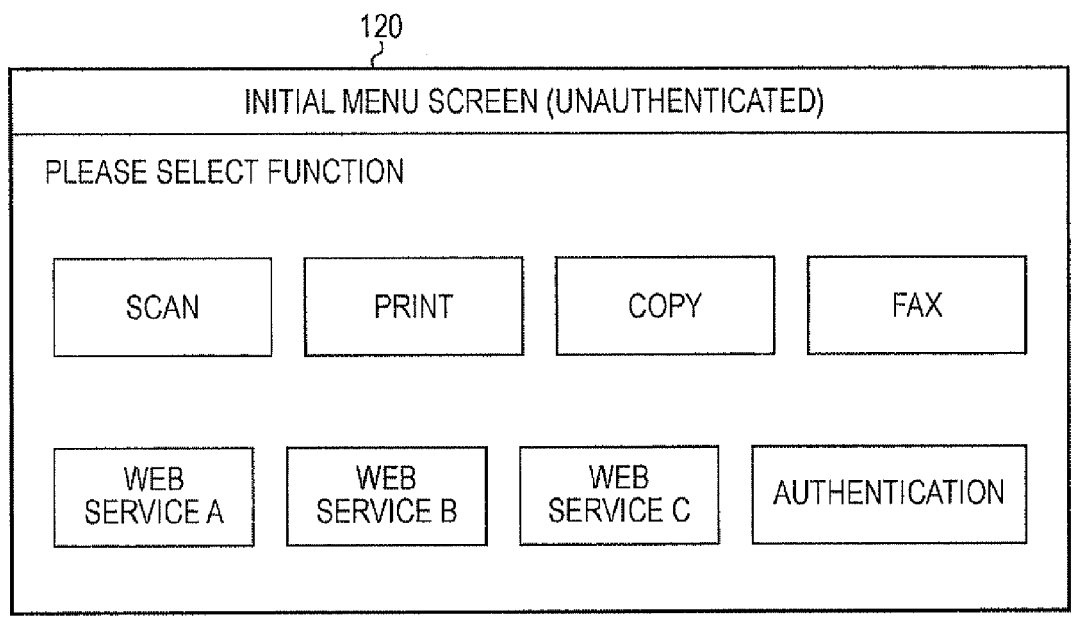
FIG. 6 illustrates an example screen displayed in the image forming apparatus.

Now, an example of a process performed by the image forming apparatus 1 will be described with reference to a flowchart illustrated in FIG. 5. First, the controller 27 causes the display unit 28 to display an initial menu screen (S01). FIG. 6 illustrates an example of the initial menu screen. For example, an initial menu screen 120 is displayed in which functions (scan function, print function, copy function, and facsimile function) of the image forming apparatus 1 and web services are selectable by a user. At this point, an authentication process regarding the image forming apparatus 1 has not been performed for a user. The user is capable of specifying any one of items "scan (image scanning)", "print (printing)", "copy (copying)", "fax (facsimile)", "web service A", "web service B", "web service C", and "authentication" in the initial menu screen 120 by using the UI unit 17. The item "web service A" is for specifying utilization of the web service A provided by the web server 3A. The item "web service B" is for specifying utilization of the web service B provided by the web server 3B. The item "web service C" is for specifying utilization of the web service C provided by the web server 3C. The item "authentication" is for specifying an authentication process regarding the image forming apparatus 1 for a user.

Figure 7:
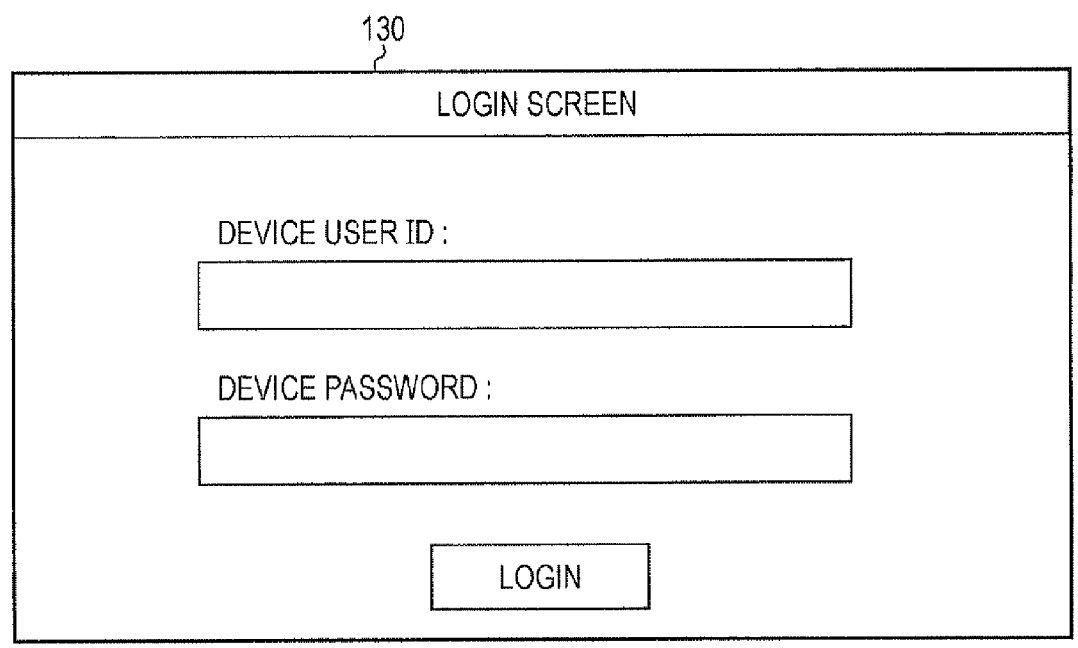
FIG. 7 illustrates an example screen displayed in the image forming apparatus.

If the user selects "authentication" in the initial menu screen 120 by using the UI unit 17 (YES in S02) in order to be authenticated by the image forming apparatus 1 and log into the image forming apparatus 1, the authentication processing unit 22 performs an authentication process (S03). For example, the user places an IC card that has the device authentication information stored therein over a card reader of the image forming apparatus 1, thereby inputting the device authentication information to the image forming apparatus 1. The accepting unit 21 accepts the device authentication information which includes the device user ID and the device password, and outputs the device authentication information to the authentication processing unit 22. Alternatively, as illustrated in FIG. 7 for example, the controller 27 may cause the display unit 28 to display a login screen 130 for authentication, and the user may input the device user ID and the device password in the login screen 130. The authentication processing unit 22 receives the device authentication information from the accepting unit 21, performs an authentication process regarding the image forming apparatus 1 for the user on the basis of the device authentication information, and outputs the authentication result to the controller 27.

Figure 8:
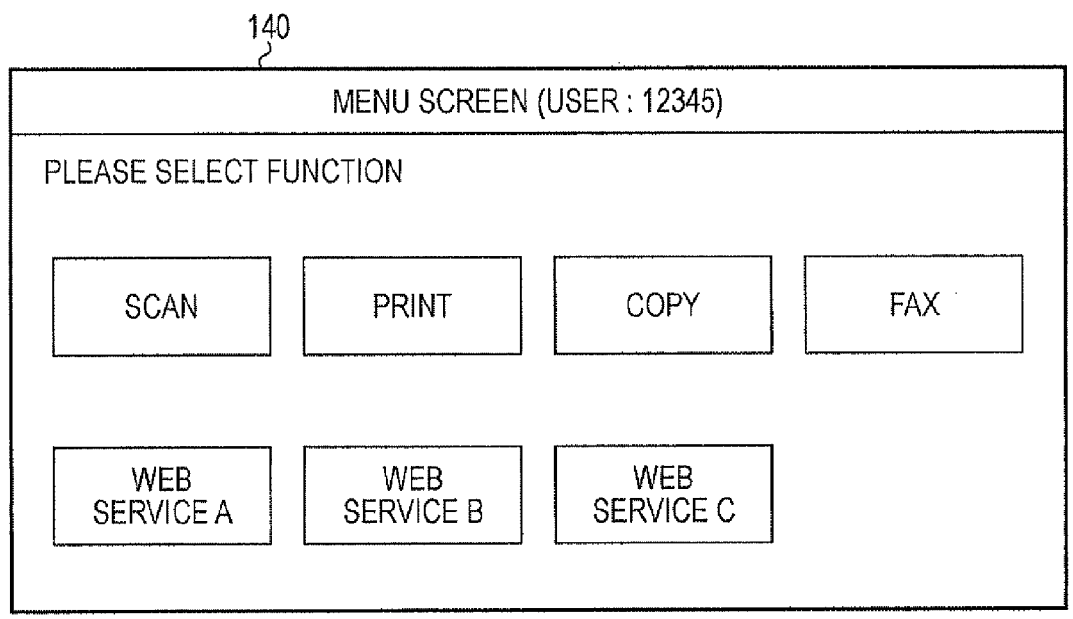
FIG. 8 illustrates an example screen displayed in the image forming apparatus.

If the authentication by the authentication processing unit 22 is successful (YES in S04), the controller 27 causes the display unit 28 to display a menu screen for a user who has been authenticated by the image forming apparatus 1 (S05). FIG. 8 illustrates an example of the menu screen. For example, a menu screen 140 is displayed in which functions (scan function, print function, copy function, and facsimile function) of the image forming apparatus 1 and the web services A, B, and C that the authenticated user is permitted to use are selectable by the user. Alternatively, available functions of the image forming apparatus 1 and available web services may be limited on a user-by-user basis and the controller 27 may cause the display unit 28 to display a menu screen prepared for each user.

For example, the menu screen 140 illustrated in FIG. 8 is a menu screen for the user having the device user ID "12345". The user having the device user ID "12345" is permitted to use the scan function, the print function, the copy function, and the facsimile function (fax function) as the functions of the image forming apparatus 1, and is also permitted to utilize the web services A, B, and C as the web services.

If the authentication is not successful (NO in S04), the controller 27 causes the display unit 28 to display information indicating unsuccessful authentication. The process then returns to S03, for example.

Subsequently, if the user specifies a specific web service on the menu screen 140 by using the UI unit 17 (YES in S06), the controller 27 receives information indicating the web service specified by the user from the accepting unit 21, and causes the authentication information acquiring unit 24 to acquire the service authentication information that is associated with the device user identification information of the authenticated user and is for utilizing the web service specified by the user (S07). Under the control of the controller 27, the authentication information acquiring unit 24 acquires the service authentication information from the authentication information storage unit 23 and outputs the acquired service authentication information to the controller 27.

For example, when the user having the device user ID "12345" is authenticated and the web service B is specified by the user on the menu screen 140, the authentication information acquiring unit 24 acquires from the authentication information storage unit 23 the service user ID (xxxxx@abc.jp) and the service password (bbbbbb) for allowing the user having the device user ID "12345" to utilize the web service B. The authentication information acquiring unit 24 then outputs the service user ID and the service password to the controller 27.

Figure 9:
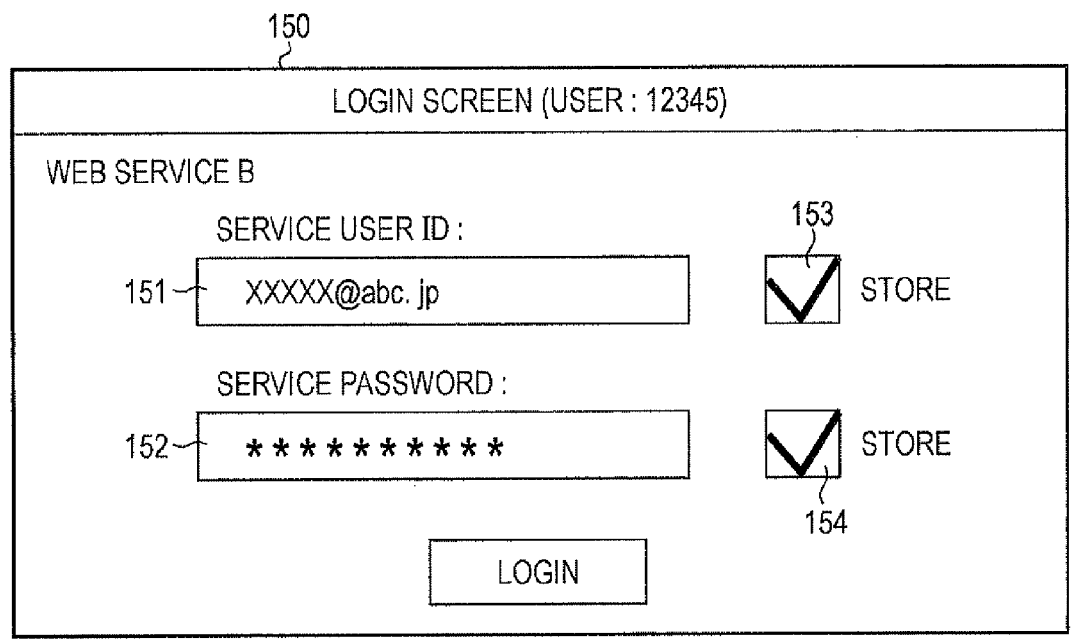
FIG. 9 illustrates an example screen displayed in the image forming apparatus.

The controller 27 causes the display unit 28 to display a login screen for logging into the web service specified by the user, the login screen displaying the service authentication information acquired by the authentication information acquiring unit 24 (S08). FIG. 9 illustrates an example of a login screen for allowing a user having been authenticated by the image forming apparatus 1 to log into the web service. A login screen 150 is, for example, a screen for accepting the service authentication information for logging into the web service B provided by the web server 3B. For example, the login screen 150 includes entry fields 151 and 152 and checkboxes 153 and 154. The entry field 151 is a field where the service user identification information, such as the service user ID, is input. The entry field 152 is a field where the service password is input. The checkbox 153 is a field where the user instructs the image forming apparatus 1 whether or not to store the service user identification information, such as the service user ID, therein. The checkbox 154 is a field where the user instructs the image forming apparatus 1 whether or not to store the service password therein. When the user has been authenticated by the authentication processing unit 22, the controller 27 displays the service authentication information acquired by the authentication information acquiring unit 24 on the login screen 150. In the example illustrated in FIG. 9, the controller 27 displays the service user ID (xxxxx@abc.jp) used by the user having the device user ID "12345" to utilize the web service B in the entry field 151, and displays the service password (bbbbbb) in the entry field 152. In terms of security, the controller 27 may display a predetermined character string (of asterisk (*), for example) in the entry field 152 instead of the service password. In this manner, the service authentication information (the service user ID and the service password) is automatically input in the entry fields 151 and 152 of the login screen 150 for accepting the service authentication information, when the user has been authenticated by the authentication processing unit 22. This allows the user to check the service authentication information automatically input in the entry fields 151 and 152 of the login screen 150 and to input an instruction to log into the web service to be utilized. The user may correct the service user identification information and the service password automatically input in the entry fields 151 and 152 or newly input the service user identification information and the service password in the entry fields 151 and 152 by using the UI unit 17.

When the user selects to store the service user identification information, such as the service user ID, in the image forming apparatus 1, the user just sets the checkbox 153 to a checked state by using the UI unit 17. In contrast, if the user selects not to store the service user identification information in the image forming apparatus 1, the user just sets the checkbox 153 to an unchecked state by using the UI unit 17. Additionally, when the service user identification information associated with the device user identification information has already been stored in the image forming apparatus 1, the stored service user identification information may be deleted once the unchecked state is selected in the checkbox 153. When the service user identification information is stored in the image forming apparatus 1, the authentication information storage unit 23 stores the service user identification information, such as the service user ID, in association with the device user identification information. If the user selects to store the service password in the image forming apparatus 1, the user just sets the checkbox 154 to the checked state by using the UI unit 17. In contrast, if the user selects not to store the service password in the image forming apparatus 1, the user just sets the checkbox 154 to the unchecked state by using the UI unit 17. When the service password associated with the device user identification information has already been stored in the image forming apparatus 1, the service password may be deleted once the unchecked state is selected in the checkbox 154. When the service password is stored in the image forming apparatus 1, the authentication information storage unit 23 stores the service password in association with the device user identification information. The checkboxes 153 and 154 may be omitted from the login screen 150 and the image forming apparatus 1 may be configured to store the service authentication information which includes the service user identification information and the service password. Additionally, when the checkboxes 153 and 154 are included in the login screen 150, the checkboxes 153 and 154 may be set to the checked state by default so that the service user identification information and the service password are stored in the image forming apparatus 1.

Once the user inputs an instruction to log into the web service, the controller 27 receives the instruction via the accepting unit 21, outputs the service authentication information input in the entry fields 151 and 152 to the accessing unit 29, and causes the accessing unit 29 to execute an access. For example, upon the user specifying a "login" button in the login screen 150, the controller 27 outputs the service authentication information to the accessing unit 29, and causes the accessing unit 29 to execute an access.

The accessing unit 29 accesses the web server that provides the web service specified by the user, by using the service authentication information output from the controller 27 (S09). First, the accessing unit 29 sends the service authentication information output from the controller 27, to the web server that provides the web service specified by the user with the communication unit 16 via the communication channel 2. The web server having received the service authentication information from the image forming apparatus 1 performs an authentication process regarding the web service on the basis of the received service authentication information. If the authentication is successful, the web server provides the web service to the image forming apparatus 1. If the authentication is not successful, the web server does not provide the web service to the image forming apparatus 1. In the examples illustrated in FIGS. 3 and 9, the accessing unit 29 sends the service authentication information including the service user ID (xxxxx@abc.jp) and the service password (bbbbbb) to the web server 3B that provides the web service B via the communication channel 2. The web server 3B performs an authentication process on the basis of the service authentication information received from the image forming apparatus 1. If the authentication is successful, the web server 3B provides the web service B to the image forming apparatus 1. If the authentication regarding the web service is not successful, the web server 3B may send information indicating unsuccessful authentication to the image forming apparatus 1 via the communication channel 2. In this case, the accessing unit 29 may receive the information indicating unsuccessful authentication with the communication unit 16 via the communication channel 2, and the controller 27 may cause the display unit 28 to display the information indicating unsuccessful authentication.

The processing in S08 may be omitted. That is, the accessing unit 29 may automatically access the web server by using the service authentication information acquired by the authentication information acquiring unit 24 without displaying the login screen for logging into the web service. Specifically, the controller 27 does not cause the display unit 28 to display the login screen for logging into the web service but just outputs the service authentication information acquired by the authentication information acquiring unit 24 to the accessing unit 29. The accessing unit 29 accesses the web server that provides the web service specified by the user, by using the service authentication information. In this manner, once the user selects a specific web service in S06, the authentication information acquiring unit 24 acquires from the authentication information storage unit 23 the service authentication information for utilizing the web service selected by the user, and the accessing unit 29 automatically accesses the web server that provides the web service selected by the user, by using the service authentication information acquired by the authentication information acquiring unit 24. By omitting displaying of the login screen for logging into the web service, the access instruction of the user is omitted. As a result, access to the web server is made more rapidly than the case of displaying the login screen.

When the user utilizes a web service in an unauthenticated state without logging into the image forming apparatus 1 (NO in S02), the user selects a to-be-utilized web service by using the UI unit 17 (S10). For example, when the user selects a to-be-utilized web service in the initial menu screen 120 illustrated in FIG. 6 (YES in S10), the controller 27 receives information indicating the web service specified by the user from the accepting unit 21, and causes the identifier acquiring unit 26 to acquire the service user identification information for utilizing the specified web service (S11). Under the control of the controller 27, the identifier acquiring unit 26 acquires the service user identification information from the identifier storage unit 25, and outputs the acquired service user identifier information to the controller 27.

For example, when the web service B is specified by the user in the initial menu screen 120, the identifier acquiring unit 26 acquires from the identifier storage unit 25 the service user IDs (BBBB11, BBBB22, and BBBB33) that have been input in order to utilize the specified web service B, and outputs the service user IDs to the controller 27.

Figure 10A:
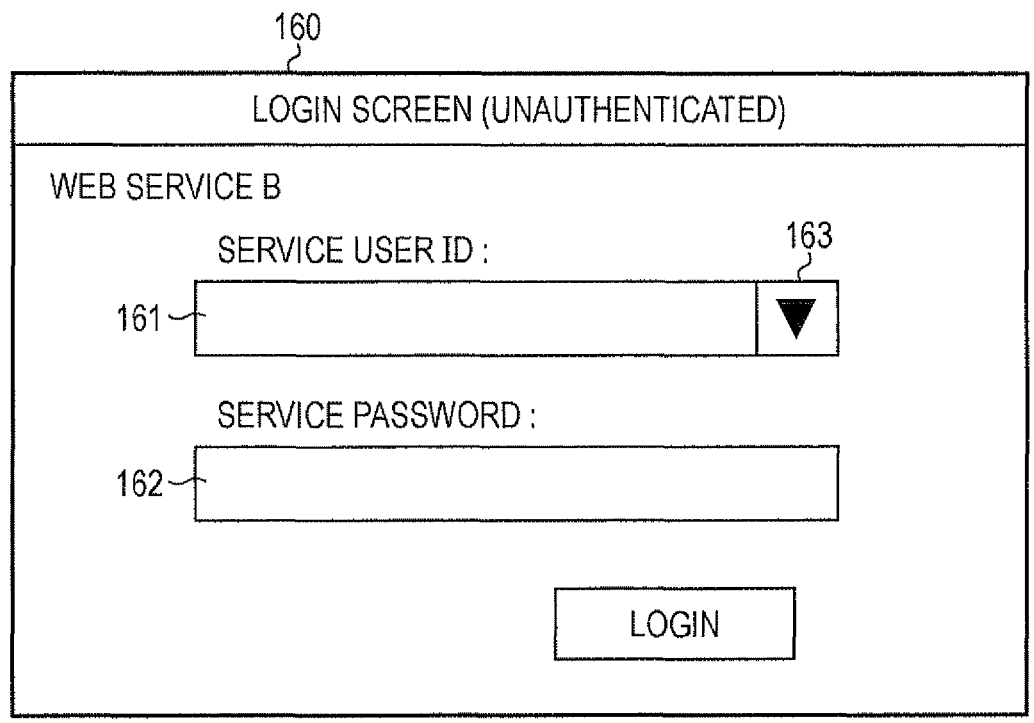
FIGS. 10A and 10B illustrate example screens displayed in the image forming apparatus.
Figure 10B:
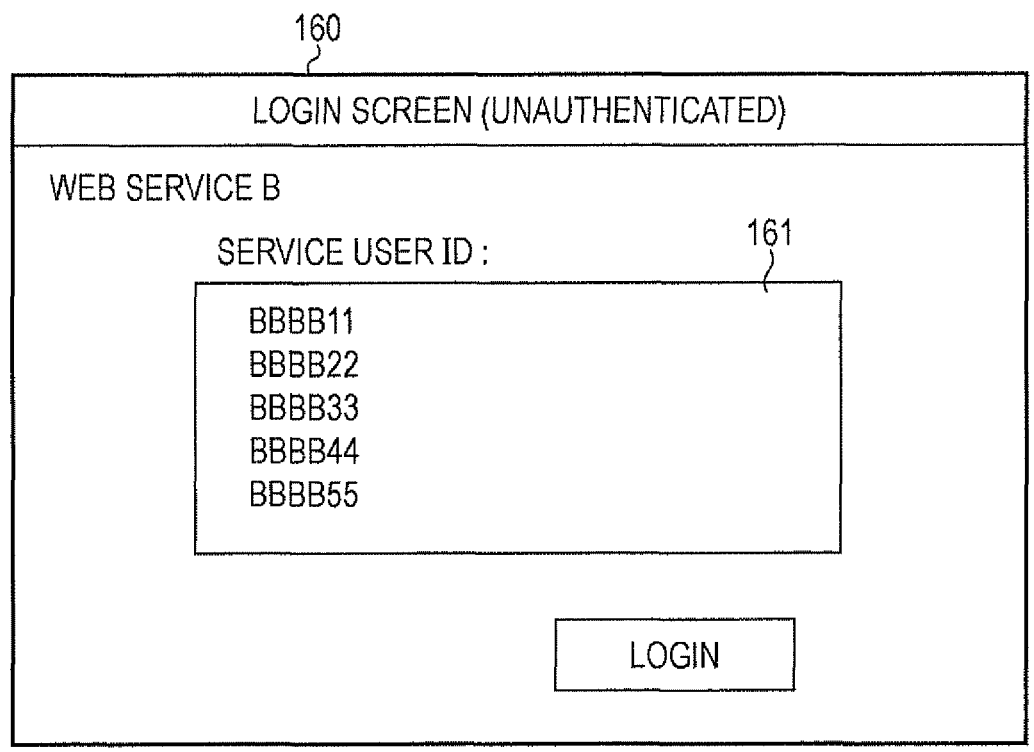

The controller 27 causes the display unit 28 to display a login screen for logging into the web service specified by the user, the login screen displaying the service user identification information acquired by the identifier acquiring unit 26 (S12). FIGS. 10A and 10B illustrate an example of the login screen for logging into the web service in the unauthenticated state in which the user does not log into the image forming apparatus 1. A login screen 160 illustrated in FIG. 10A is, for example, a screen for accepting the service authentication information for logging into the web service B provided by the web server 3B. The login screen 160 includes entry fields 161 and 162, for example. The entry field 161 is a field where the service user identification information, such as the service user ID, is input. The entry field 162 is a field where the service password is input. When the user has not been authenticated by the authentication processing unit 22, the controller 27 displays the service user identification information acquired by the identifier acquiring unit 26 in the login screen 160. For example, when plural pieces of service user identification information are acquired by the identifier acquiring unit 26, the controller 27 may display the login screen 160 including a list of the plural pieces of service user identification information. The controller 27 may also display the plural pieces of service user identification information in the login screen 160 as a so-called pull-down (drop-down) menu. For example, an arrow button 163 is provided in the entry field 161 of the login screen 160 illustrated in FIG. 10A. If the user specifies the arrow button 163 by using the UI unit 17, the controller 27 displays the plural pieces of service user identification information acquired by the identifier acquiring unit 26 in the entry field 161 as illustrated in FIG. 10B. In the example illustrated in FIG. 10B, a list of plural service user IDs (BBBB11, BBBB22, BBBB33, BBBB44, and BBBB55) is displayed in the entry field 161. In this manner, when the user has not been authenticated by the authentication processing unit 22, the service user identification information, such as the service user ID, is displayed in the entry field 161 of the login screen 160 for accepting the service authentication information.

Subsequently, the user selects their service user identification information from among the plural pieces of service user identification information displayed in the login screen 160 and inputs their service password in the entry field 162 by using the UI unit 17 (S13).

The identifier storage unit 25 stores the service user identification information, such as the service user ID, input in the entry field 161, in association with a web service. For example, when new service user identification information is input by a user on the login screen 160 by using the UI unit 17, the identifier storage unit 25 receives the service user identification information input by the user from the accepting unit 21, and stores the service user identification information in association with a web service. Additionally, a checkbox that allows a user to instruct the image forming apparatus 1 whether or not to store their service user identification information therein may be provided in the login screen 160. If the user sets the checkbox to the checked state by using the UI unit 17, the identifier storage unit 25 may store the service user identification information input in the entry field 161. If the checkbox is in the unchecked state, the identifier storage unit 25 does not store the service user identification information input in the entry filed 161. When the checkbox is provided in the login screen 160, the checkbox may be set to the checked state by default so that the service user identification information is stored in the image forming apparatus 1. Additionally, a checkbox that allows a user to instruct the image forming apparatus 1 whether or not to store their service password therein may be provided in the login screen 160. If the user sets the checkbox to the checked state by using the UI unit 17, the identifier storage unit 25 may store the service password input in the entry field 162 in association with the service user identification information input in the entry field 161.

Once the user inputs an instruction to log into the web service, the controller 27 receives the instruction via the accepting unit 21. The controller 27 then outputs the service authentication information input in the entry fields 161 and 162 to the accessing unit 29, and causes the accessing unit 29 to execute an access. For example, in response to specification of a "login" button in the login screen 160 by the user, the controller 27 outputs the service authentication information to the accessing unit 29 and causes the accessing unit 29 to execute an access.

As in the above-described processing in S09, the accessing unit 29 accesses the web server that provides the web service specified by the user, by using the service authentication information output from the controller 27 (S14). For example, when the service user ID (BBBB11) is selected and the service password is input by the user on the login screen 160 illustrated in FIG. 10B, the accessing unit 29 sends the service authentication information including the service user ID (BBBB11) and the service password to the web server 3B that provides the web service B via the communication channel 2. The web server 3B performs an authentication process on the basis of the service authentication information received from the image forming apparatus 1. If the authentication is successful, the web server 3B provides the web service B to the image forming apparatus 1. If the authentication regarding the web service is not successful, information indicating unsuccessful authentication may be displayed in the image forming apparatus 1 as in the above-described processing in S09.

Additionally, the state may be shifted from the unauthenticated state in which a user has not been authenticated by the authentication processing unit 22 to the authenticated state, or from the authenticated state to the unauthenticated state. For example, suppose that the controller 27 causes the display unit 28 to display the login screen 160 for an unauthenticated user illustrated in FIGS. 10A and 10B in S12 and then a user places their IC card over a card reader connected to the image forming apparatus 1 so as to input the device authentication information stored in the IC card to the image forming apparatus 1, whereby the user is authenticated by the authentication processing unit 22. In this case, the controller 27 may cause the authentication information acquiring unit 24 to acquire the service authentication information associated with the device user identification information of the authenticated user. Subsequently, the controller 27 causes the display unit 28 to display the login screen 150 for an authenticated user illustrated in FIG. 9 instead of the login screen 160 for an unauthenticated user, the login screen 150 displaying the service authentication information acquired by the authentication information acquiring unit 24. Alternatively, the controller 27 may output the service authentication information acquired by the authentication information acquisition unit 24 to the accessing unit 29 without causing the display unit 28 to display the login screen 150 illustrated in FIG. 9, and may cause the accessing unit 29 to execute an access to a web server.

In addition, the controller 27 may cancel the authenticated state in accordance with a predetermined condition after causing the display unit 28 to display the login screen 150 for an authenticated user illustrated in FIG. 9 in S08. When the authenticated state is canceled, the controller 27 may cause the identifier acquiring unit 26 to acquire the service user identification information. In this case, the controller 27 causes the display unit 28 to display the login screen 160 for an unauthenticated user illustrated in FIGS. 10A and 10B instead of the login screen 150 for an authenticated user, the login screen 160 displaying the service user identification information acquired by the identifier acquiring unit 26. For example, an authentication cancellation button may be provided in the UI unit 17 or the like. The user may press the authentication cancellation button, thereby inputting an authentication cancellation instruction to the image forming apparatus 1. The controller 27 receives a signal in response to pressing of the authentication cancellation button, cancels the authenticated state, and causes the display unit 28 to display the login screen 160 for an unauthenticated user instead of the login screen 150. Additionally, if a predetermined period has passed without any operation on the image forming apparatus 1 after displaying of the login screen 150 illustrated in FIG. 9 on the display unit 28, the controller 27 may cancel the authenticated state, and cause the display unit 28 to display the login screen 160 for an unauthenticated user instead of the login screen 150. By shifting the state from the authenticated state to the unauthenticated state in this manner, it is attempted to prevent the service authentication information displayed in the login screen 150 from being seen by other people. For example, when a user temporarily leaves the image forming apparatus 1 after being authenticated by the image forming apparatus 1 and logging into the image forming apparatus 1, the user presses the authentication cancellation button to cancel the authenticated state, thereby preventing their service authentication information from being seen by other people. When a predetermined period has passed without any operation on the image forming apparatus 1 after authentication of a user by the image forming apparatus 1, the image forming apparatus 1 automatically shifts into the unauthenticated state from the authenticated state, thereby preventing the service authentication information from being seen by other people.

Modification

Figure 11:
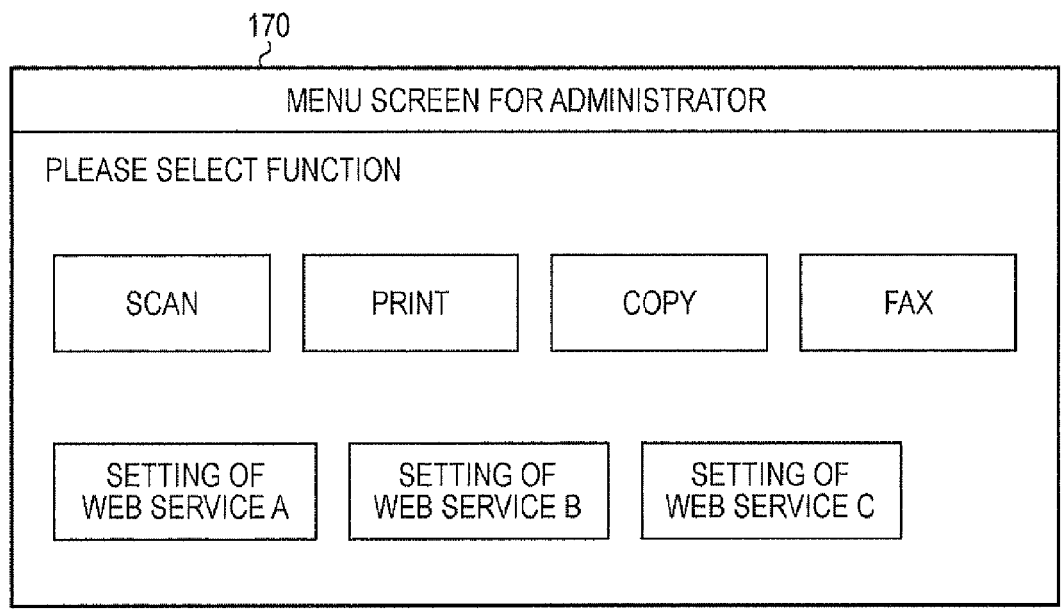
FIG. 11 illustrates an example screen displayed in the image forming apparatus.

A modification will now be described with reference to FIG. 11. For example, when an administrator having rights to make various settings in the image forming apparatus 1 has been authenticated by the authentication processing unit 22, the controller 27 may cause the display unit 28 to display a menu screen for an administrator. By way of example, the controller 27 may cause the display unit 28 to display a menu screen 170 for an administrator illustrated in FIG. 11, instead of the menu screen 140 illustrated in FIG. 8. The menu screen 170 for an administrator is displayed in which functions (scan function, print function, copy function, and facsimile function) of the image forming apparatus 1 that the authenticated administrator is permitted to use and settings of the web services A, B, and C are selectable by the administrator. Items "settings" of the web services A, B, and C are, for example, for setting conditions on which the image forming apparatus 1 is connected to the web servers 3A, 3B, and 3C via the communication channel 2. An item for setting of the image forming apparatus 1 may be displayed in the menu screen 170 so that it is selectable by the administrator. Although the functions of the image forming apparatus 1 are displayed in the menu screen 170 so that they are selectable by the administrator in the example illustrated in FIG. 11, the menu screen 170 for an administrator may be displayed in which only settings of the web services A, B, and C and setting of the image forming apparatus 1 are selectable. In addition, the state may be shifted from the authenticated state in which the user has been authenticated as the administrator by the authentication processing unit 22 to the unauthenticated state, or from the unauthenticated state to the authenticated state.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an authentication processing unit that authenticates a user for using a function of the information processing apparatus using device authentication information regarding a right to use the information processing apparatus;
    a display unit that displays information;
    a memory unit;
    a first user information acquiring unit that acquires a first user information for accessing an external service, the first user information being stored user identification information and password information for accessing an external service, and the first user information is associated with the device authentication information;
    a second user information acquiring unit that acquires a second user information different from the first user information, the second user information being pre-input by an unauthorized user and stored in the memory unit, the second user information being user identification information used for accessing the external service;
    a judging unit that judges whether a user has been authenticated by the authentication processing unit when a user attempts to access the external service; and
    a controller that performs control in such a manner wherein:
        when the judging unit judges that the user has been authenticated by the authentication processing unit, the first user information acquiring unit retrieves the first user information and the judging unit accesses the external service, and
        when that the judging unit judges that the user has not been authenticated by the authentication processing unit, the second user information acquiring unit retrieves the second user information and the display unit displays the second user information, and accesses the external service by using second user information selected from among the displayed second user information and an input password information input by the user,
    wherein the controller performs control so that the display unit displays the first user information acquired by the first user information acquiring unit and accesses the external service upon receipt of an instruction to access the external service, and
    wherein in response to an elapse of a predetermined period or arrival of an instruction to cancel an authenticated state after the displaying of the first user information acquired by the first user information acquiring unit on the display unit, the controller performs control so that the second user information acquiring unit acquires the second user information and the display unit displays the unauthenticated access information acquired by the second user information acquiring unit instead of the first user information.

2. The information processing apparatus according to claim 1,
    wherein the memory receives via a communication channel the first user information and pre-stores the first user information, and
    wherein the first user information acquiring unit acquires the first user information from the memory.

3. The information processing apparatus according to claim 1,
    wherein when a user has been authenticated by the authentication processing unit, the memory stores newly input first user information with information from the same first user which has been previously input, and wherein the first user information acquiring unit acquires first user information from the memory.

4. The information processing apparatus according to claim 3, wherein when a user has been authenticated by the authentication processing unit and the first user information for utilizing the external service has been input, the controller performs control so that the display unit displays an indication that allows the user who has been authenticated by the authentication processing unit to input an instruction to store or not to store the user information and the input information in association with each other in the memory, and the controller determines, on the basis of the instruction of the user, whether or not to store the user information and the input information in association with each other in the memory.

5. The information processing apparatus according to claim 4, wherein when the instruction of the user is not to store the user information and the input information in association with each other, the controller deletes the input information stored in the memory in association with the user information who has been authenticated by the authentication processing unit.

6. The information processing apparatus according to claim 1, wherein the first user information is stored in a memory allocated for the external service, the judging unit judges whether a user has been authenticated by the authentication processing unit when the user selects an external service among a plurality of external services, and, when the judging unit judges that the user has not been authenticated by the authentication unit, the first user information acquiring unit acquires the first user information in accordance with the external service selected, by the user, from the memory.

7. The information processing apparatus according to claim 1, wherein when the judging unit judges that the user has been authenticated by the authentication processing unit, at least some of the first user information is displayed on the display unit.

8. An information processing method implemented by a computer comprising:
    performing authentication of an user;
    accessing an external service via a communication channel;
    retrieving first user information which is stored user identification information and password information for accessing the external service in the accessing and for utilizing the external service and which is associated with user information for identifying a user who has been authenticated in the performing of authentication, the first user information being associated with device authentication information which is information regarding a right to use an information processing apparatus;
    retrieving second user information which is different from the first user information and is user identification information and password information having been previously input by an unauthenticated user who has not been authenticated in the performing of authentication and having been used in the accessing;
    judging whether a user has been authenticated when a user attempts to access the external service; and
    performing control whereby:
        when the judging step judges that the user has been authenticated, the acquiring of first user information includes acquiring authenticated access information associated with the user information of the user who has been authenticated in the performing of authentication and the accessing accesses the external service by using the acquired authenticated access information,
        when a user attempts to access the external service in the accessing without being authenticated in the performing of authentication, so that the acquiring of second user information acquires the second user information and the acquired second user information is displayed, the external service is accessed by using second user information selected from among the displayed second user information and an input password, and
    a display unit displays the acquired first user information acquired and accesses the external service upon receipt of an instruction to access the external service,
    wherein in response to an elapse of a predetermined period or arrival of an instruction to cancel an authenticated state after the displaying of the acquired first user information on the display unit, performing control to acquire the second user information, and the display unit displays unauthenticated access information acquired by the acquiring of the second user information instead of the first user information.

9. A non-transitory computer readable medium storing a program causing a computer to execute a process for information processing, the process comprising:
    performing authentication of an user;
    accessing an external service via a communication channel;
    retrieving first user information which is stored user identification information and password information for accessing the external service in the accessing and for utilizing the external service and which is associated with user information for identifying a user who has been authenticated in the performing of authentication, the first user information being associated with device authentication information which is information regarding a right to use an information processing apparatus;
    retrieving second user information which is different from the first user information and is user identification information and password information having been input by an unauthenticated user who has not been authenticated in the performing of authentication and having been used in the accessing;
    judging whether a user has been authenticated when a user attempts to access the external service; and
    performing control whereby:
        when the judging step judges that the user has been authenticated, the acquiring of first user information acquires authenticated access information associated with the user information of the user who has been authenticated in the performing of authentication and the accessing accesses the external service by using the acquired authenticated access information, and
        when a user attempts to access the external service in the accessing without being authenticated in the performing of authentication, so that the acquiring of second user information acquires the second user information and the acquired second user information is displayed, the external service is accessed by using second user information selected from among the displayed second user information and an input password, and
    a display unit displays the acquired first user information acquired and accesses the external service upon receipt of an instruction to access the external service,
    wherein in response to an elapse of a predetermined period or arrival of an instruction to cancel an authenticated state after the displaying of the acquired first user information on the display unit, performing control to acquire the second user information, and the display unit displays unauthenticated access information acquired by the acquiring of the second user information instead of the first user information.

10. An information processing apparatus comprising:
an authentication processing unit that authenticates a user for using a function of the information processing apparatus using device authentication information regarding a right to use the information processing apparatus;
a display unit that displays information;
a memory unit;
a first user information acquiring unit that acquires a first user information for accessing an external service, the first user information being stored user identification information and password information for accessing an external service, and the first user information is associated with the device authentication information;
a second user information acquiring unit that acquires a second user information which is different from the first user information and pre-input by an unauthenticated user and stored in the memory unit, the second user information being user identification information used for accessing the external service;
a judging unit that judges whether a user has been authenticated by the authentication processing unit when a user attempts to access the external service; and
a controller that performs control in such a manner wherein:
when the judging unit judges that the user has been authenticated by the authentication processing unit, the first user information acquiring unit retrieves the first user information and accesses the external service, and
when that the judging unit judges that the user has not been authenticated by the authentication processing unit, the second user information acquiring unit retrieves the second user information and the display unit displays the second user information, and accesses the external service by using second user information selected from among the displayed second user information and an input password information input by the user, and
wherein when the user is authenticated by the authentication processing unit after the displaying of the second user information acquired by the second user information acquiring unit on the display unit, the controller performs control so that the first information acquiring unit acquires first user information of the user and the display unit displays the first user information acquired by the first user information acquiring unit instead of the second user information,
wherein the controller performs control so that the display unit displays the first user information acquired by the first user information acquiring unit and accesses the external service upon receipt of an instruction to access the external service, and wherein in response to an elapse of a predetermined period or arrival of an instruction to cancel an authenticated state after the displaying of the first user information acquired by the first user information acquiring unit on the display unit, the controller performs control so that the second user information acquiring unit acquires the second user information and the display unit displays the unauthenticated access information acquired by the second user information acquiring unit instead of the first user information.

11. The information processing apparatus according to claim 10,
wherein the memory receives via a communication channel the first user information and pre-stores the first user information,
wherein the first user information acquiring unit acquires the first user information from the memory.

12. The information processing apparatus according to claim 10, wherein
when a user has been authenticated by the authentication processing unit, the memory stores newly input first user information with information from the same first user which has been previously input, and
wherein the first user information acquiring unit acquires first user information from the memory.

13. The information processing apparatus according to claim 12, wherein when a user has been authenticated by the authentication processing unit and the first user information for utilizing the external service has been input, the controller performs control so that the display unit displays an indication that allows the user who has been authenticated by the authentication processing unit to input an instruction to store or not to store user information and the input information in association with each other in the memory, and the controller determines, on the basis of the instruction of the user, whether or not to store the user information and the input information in association with each other in the memory.

14. The information processing apparatus according to claim 13, wherein when the instruction of the user is not to store the user information and the input information in association with each other, the controller deletes the input information stored in the memory in association with the user information of the user who has been authenticated by the authentication processing unit.

15. The information processing apparatus according to claim 10, wherein
the second user information comprises information input by an unauthorized user for accessing an external device,
the second user information is stored on a memory allocated for the external service, and
when a user is not authenticated, the second acquiring unit acquires the second user information from the memory allocated for the external service.

\* \* \* \* \*